United States Patent
Rufo Torres (10) Patent No.: US 9,633,485 B2
(45) Date of Patent: Apr. 25, 2017

(54) SYSTEM AND METHOD FOR THE ACCESS TO INFORMATION CONTAINED IN MOTOR VEHICLES

(71) Applicants: Pedro David Gonzalez Vera, Las Palmas de Gran Canaria (ES); Gloria Eisman Maraver, Las Palmas de Gran Canaria (ES)

(72) Inventor: Julio Francisco Rufo Torres, Las Palmas de Gran Canaria (ES)

(73) Assignees: Pedro David González Vera, Las Palmas de Garn Canaria (ES); Gloria Eisman Maraver, Las Palmas de Garn Canaria (ES)

( * ) Notice: Subject to any disclaimer, the term of this patent is extended or adjusted under 35 U.S.C. 154(b) by 105 days.

(21) Appl. No.: 14/772,822

(22) PCT Filed: Mar. 4, 2013

(86) PCT No.: PCT/EP2013/054245
§ 371 (c)(1),
(2) Date: Sep. 4, 2015

(87) PCT Pub. No.: WO2014/135184
PCT Pub. Date: Sep. 12, 2014

(65) Prior Publication Data
US 2016/0019729 A1    Jan. 21, 2016

(51) Int. Cl.
*G01M 17/00*  (2006.01)
*G06F 7/00*  (2006.01)
(Continued)

(52) U.S. Cl.
CPC .......... *G07C 5/008* (2013.01); *B60R 16/0234* (2013.01); *H01Q 1/2208* (2013.01);
(Continued)

(58) Field of Classification Search
None
See application file for complete search history.

(56) References Cited

U.S. PATENT DOCUMENTS

| 4,996,643 | A | * | 2/1991 | Sakamoto | G01R 31/007 |
| | | | | | 701/29.6 |
| 5,005,142 | A | * | 4/1991 | Lipchak | G06F 11/0709 |
| | | | | | 376/245 |

(Continued)

FOREIGN PATENT DOCUMENTS

| JP | 2005-269212 | 9/2005 |
| JP | 2012-171449 | 9/2012 |

OTHER PUBLICATIONS

International Search Report and Written Opinion for PCT/EP2013/054245 dated Nov. 15, 2013.

*Primary Examiner* — Bhavesh V Amin
(74) *Attorney, Agent, or Firm* — Gardner Groff Greenwald & Villanueva, PC (57) ABSTRACT

System and method for the access to information contained in motor vehicles. The system comprises: —a control unit (206) configured for: •capturing determined information of the vehicle (100) coming from some electronic component, preferable from the ECU (214); •generating a data message from said information—an optical transmitter (216) for the transmission of said data message (122) by means of visible optical communication through some light (104) of the vehicle. The information is captured by a communications terminal (102) by means of an optical receiver (106) and is sent to an analysis terminal (114) for its processing, being able to be employed for the control of access or diagnostic of the vehicle, among other applications.

15 Claims, 8 Drawing Sheets

(51) Int. Cl.
*G06F 19/00* (2011.01)
*G07C 5/00* (2006.01)
*B60R 16/023* (2006.01)
*H01Q 1/22* (2006.01)
*H01Q 1/32* (2006.01)
*H04B 10/116* (2013.01)
*B60Q 1/04* (2006.01)
*G07C 5/08* (2006.01)

(52) U.S. Cl.
CPC ......... *H01Q 1/3291* (2013.01); *H04B 10/116* (2013.01); *B60Q 1/04* (2013.01); *G07C 5/085* (2013.01)

(56) References Cited

U.S. PATENT DOCUMENTS

| | | | | |
|---|---|---|---|---|
| 5,400,018 | A * | 3/1995 | Scholl | G08G 1/20 340/10.3 |
| 5,442,553 | A * | 8/1995 | Parrillo | G06F 8/65 455/420 |
| 5,541,840 | A * | 7/1996 | Gurne | B60T 8/885 701/29.3 |
| 5,583,912 | A * | 12/1996 | Schillaci | H04M 1/24 379/21 |
| 5,666,109 | A * | 9/1997 | Fukui | G08G 1/096716 235/384 |
| 5,758,300 | A * | 5/1998 | Abe | G01M 15/05 455/424 |
| 5,884,202 | A * | 3/1999 | Arjomand | G01M 15/05 340/12.54 |
| 6,064,299 | A * | 5/2000 | Lesesky | B60R 16/0315 235/384 |
| 6,111,524 | A * | 8/2000 | Lesesky | B60R 16/0315 340/928 |
| 6,400,482 | B1 * | 6/2002 | Lupton | H04B 10/1143 398/106 |
| 6,765,495 | B1 * | 7/2004 | Dunning | G08G 1/161 340/435 |
| 6,911,642 | B2 * | 6/2005 | Sartori | G06K 9/00805 250/208.2 |
| 6,959,235 | B1 * | 10/2005 | Abdel-Malek | B61L 27/0094 340/988 |
| 7,015,800 | B2 * | 3/2006 | Lesesky | B60R 16/0315 340/431 |
| 7,449,993 | B2 * | 11/2008 | Lesesky | G07C 5/008 307/10.1 |
| 7,650,210 | B2 * | 1/2010 | Breed | B60W 50/0205 701/29.1 |
| 7,734,287 | B2 * | 6/2010 | Ying | G05B 15/02 340/514 |
| 7,869,906 | B2 * | 1/2011 | Louch | H04L 12/66 701/1 |
| 7,944,345 | B2 * | 5/2011 | Brinton | G06Q 10/06 235/380 |
| 8,400,296 | B2 * | 3/2013 | Brinton | G07C 5/008 340/539.11 |
| 8,401,729 | B2 * | 3/2013 | Rouyre | B64F 5/60 701/1 |
| 8,810,385 | B2 * | 8/2014 | McQuade | G06Q 10/06 235/380 |
| 8,892,271 | B2 * | 11/2014 | Breed | G08G 1/161 701/2 |
| 2002/0040593 | A1 * | 4/2002 | Schaefer | G01N 27/221 73/61.43 |
| 2003/0236601 | A1 * | 12/2003 | McLeod | B60L 11/1846 701/31.4 |
| 2004/0085198 | A1 * | 5/2004 | Saito | B60G 17/0185 340/438 |
| 2005/0105919 | A1 * | 5/2005 | Sugihara | H04B 10/675 398/202 |
| 2005/0137782 | A1 * | 6/2005 | Shinada | G08G 1/0965 701/117 |
| 2007/0242337 | A1 * | 10/2007 | Bradley | B60Q 1/0017 359/237 |
| 2007/0242338 | A1 * | 10/2007 | Bradley | B60Q 1/0017 359/237 |
| 2007/0242339 | A1 * | 10/2007 | Bradley | B60Q 1/0017 359/237 |
| 2008/0147265 | A1 * | 6/2008 | Breed | G07C 5/0808 701/424 |
| 2008/0204268 | A1 * | 8/2008 | Dowling | H05B 37/02 340/815.45 |
| 2008/0284575 | A1 * | 11/2008 | Breed | B60C 23/0493 340/438 |
| 2008/0310850 | A1 * | 12/2008 | Pederson | G07C 9/00158 398/135 |
| 2010/0211358 | A1 * | 8/2010 | Kesler | G07C 9/00111 702/184 |
| 2013/0151065 | A1 * | 6/2013 | Ricci | G06F 9/54 701/31.4 |

* cited by examiner

SYSTEM AND METHOD FOR THE ACCESS TO INFORMATION CONTAINED IN MOTOR VEHICLES

IN THE CROSS-REFERENCE TO RELATED APPLICATIONS

This application is a U.S. national phase application under 35 USC 371 of international application number PCT/EP2013/054245, filed Mar. 4, 2013, which is hereby incorporated herein by reference in its entirety for all purposes.

FIELD OF THE INVENTION

The present invention falls within the automotive field, and more specifically, within the systems and methods for accessing and managing information available (normally stored) in motor vehicles, being able to employ said information, for example, for controlling the access of vehicles to determined facilities (garages, factories, etc.) or for performing diagnostic tasks with which to update maintenance reports and detect possible breakdowns or malfunctioning in motor vehicles.

BACKGROUND OF THE INVENTION

Currently, the access to information contained in a motor vehicle is carried out either manually (for example, looking at the vehicle identification number) or by means of connection by a cable to the electronic control unit (ECU), performed mainly in repair shops, or a tachograph installed in the vehicle.

Also, to regulate the access control of a vehicle to a facility, it is common for the number plate of the vehicle to be read by means of video cameras and character recognition technology, which require a special facility and need a sharp adjustment, of both the focus of the camera, as well as of the detection software. In addition, the readings may have errors, for example if the number plate is dirty with mud. Furthermore, this technique only allows to obtain visual information outside the vehicle, such as its number plate, but cannot access other data saved inside the control panel, for example the vehicle identification number, normally more reliable than the number plate that may have been replaced fraudulently by the user of the vehicle.

With regard to the diagnostic work of the vehicles, currently vehicle repair shops use diagnostic information on different components stored in the ECU inside the vehicle itself. Given that this data can only be read in the repair shop, it is possible that the intervals between servicing of the vehicle do not enable faults to be detected in time and significant breakdowns are produced which could have been avoided with more frequent servicing. However, it is not practical or convenient for the user to take the vehicle to a repair shop very often.

It is necessary, therefore, to have a system and a method that allows for easy access to any information contained in motor vehicles, for example for applications of access control or for fast preventative diagnostics that are easy for the user to use, which solves the previous drawbacks in a simple way.

DESCRIPTION OF THE INVENTION

The present invention relates to a system and method for the access to information contained in motor vehicles, employed, for example, for the preventative diagnostic for motor vehicles that enables detecting faults early and preventing significant breakdowns, with which the vehicle safety is improved and the amount of time in the repair shop is reduced. Furthermore, a more personalised service can be given to the user, informing them of the breakdowns detected and providing them with repair services, assistance and replacement cars where appropriate.

A first aspect of the invention relates to a system for the access to information contained in motor vehicles. The system comprises:
  a control unit configured for:
    capturing determined information of the vehicle from at least one electronic component thereof;
    generating, a data message from said information;
  an optical transmitter controlled by the control unit and configured for the transmission of said data message by means of visible optical communication through at least one of the lights of the vehicle, (in a preferred embodiment, through at least one of the headlights of the vehicle and preferably through both headlights).

The information of the vehicle captured by the control unit can be from the ECU of the vehicle and/or from a sensor or a system for capturing data installed in the vehicle, for example, a tachograph.

In a preferred embodiment the control unit is configured to begin the capturing of information, having received an information request signal. The vehicle information to be captured and transmitted may be specified in said information request signal. The system may comprise a wireless receiver installed in the vehicle for receiving the information request signal.

In an embodiment, the system comprises a communications terminal outside the vehicle and which has an optical receiver for the capturing of the data message transmitted by at least one light of the vehicle. The communications terminal may comprise, in turn, a wireless emitter for sending the information request signal, and optionally, a presence sensor, in a way that the wireless emitter carries out the sending of the information request signal when said sensor detects the presence of the vehicle.

The communications terminal preferably comprises a control unit with a communications module for the transmission of a message based on the information captured by the optical receiver to an analysis terminal. The system may comprise said analysis terminal with means of data processing configured for analysing the message received and performing at least one action depending on said analysis.

The analysis carried out by said analysis terminal may be directed at:
  an access control of the vehicle into a determined facility, in which case the at least one action to be performed is aimed at permitting or not permitting the access of the vehicle into the facility depending on the analysis performed; or
  a diagnostic for detecting possible breakdowns or malfunctioning in the vehicle, and where the at least one action to be performed is aimed at communicating said fault situation in this event.

The control unit may form part of the ECU of the vehicle, i.e., the ECU of the vehicle may perform the functions of the control unit.

A second aspect of the present invention relates to a method for the access to information contained in motor vehicles. The method comprises:
  capturing determined information of the vehicle from at least one electronic component thereof;
  generating a data message from said information;

transmitting said data message by means of visible optical communication through at least one light of the vehicle.

In a preferred embodiment, the data message is transmitted through at least one of the headlights of the vehicle.

The information captured of the vehicle may come from the ECU of the vehicle and/or from a sensor or from a system for capturing data installed in the vehicle (e.g. a tachograph).

The capturing of information begins preferably once an information request signal has been received. The information of the vehicle to be captured and transmitted may be specified in the information request signal. The information request signal may be sent by a wireless emitter outside the vehicle, in this case being received by a wireless receiver installed in the vehicle.

The method may comprise detecting the presence of the vehicle by means of a presence detector, in which case the information request signal is subsequently sent to the detection of the vehicle.

The method may comprise capturing, by means of an optical receiver outside the vehicle, the data message transmitted by at least one light of the vehicle and optionally transmit a message based on the information captured by the optical receiver to an analysis terminal. The method may comprise analysing the message received in the analysis terminal and performing at least one action depending on said analysis.

In addition, the invention enables the manufacturer to have a great amount of data for evaluating the services of the different models and detecting possible design failures to correct them with greater clarity and prevent accidents, resulting in improved road safety.

The invention can be applied to a multitude of different applications, such as access control of vehicles or the inspection by the authorities of lorry tachographs.

An additional advantage is, as the vehicle lights themselves are employed as wireless communication device, the modifications that must be carried out thereof are minimal, without the need to incorporate any additional communication device in the simplest version of the application wherein the vehicle simply sends the data through the lights independently without any external control system. A more complex version and with more services would include a receiving system in the vehicle by means of a non-guided link.

Furthermore, the means of optical communication employed is a safe means of communication, taking into account that the light signals are sent directly and are confined by the walls of the rooms therefore it is difficult for them to be intercepted, interfered or captured, intentionally or accidental. Moreover, given that the transmission speed to be used is generally much greater than the capturing speed of a conventional camera, the transmitted code cannot be duplicated easily. On the other hand, the optical communication of the information enables operation even with the presence of frequency inhibitors, increasingly common in urban environments (in proximity to ministries, police stations or military bases, etc.), which brings about an advantage with respect to the transmission of data by radiofrequency.

It is not an inconvenience for the user; as it is able to send data in one second or a couple of seconds, without the user even being aware, as the intensity and frequency of the light emitted in the communication can be adjusted to a level almost imperceptible to the human eye or it can be done automatically when the user is not present.

BRIEF DESCRIPTION OF THE DRAWINGS

Below is a brief description of a set of drawings which aid a better understanding of the invention and that expressly relate to one embodiment of said invention which is presented as a non-limitative example of it.

DETAILED DESCRIPTION OF THE INVENTION

The present invention proposes a system and method for the access to information contained in motor vehicles.

Figure 1:
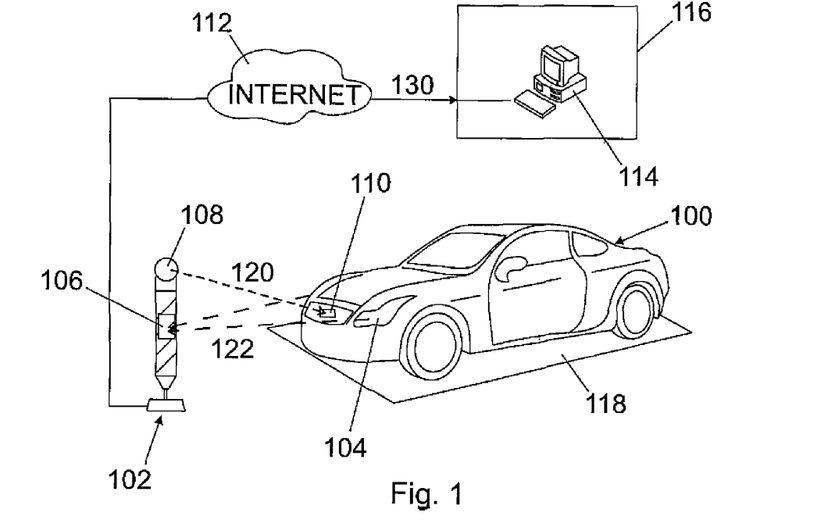
FIG. 1 shows in a schematic manner, the communications involved in the method for the access to information of the vehicle for a possible application of remote diagnostic of the vehicle.

The present invention can be applied, among other applications, to the preventative diagnostic of the vehicle, the method sends the data stored by the ECU of the vehicle automatically. Said communication for the diagnostic can be carried out in many situations. In a first embodiment, said communication is carried out each time the vehicle is parked in its garage parking space, as shown in a schematic manner in FIG. 1. With the aim of carrying out this process in a way convenient for the user, the use of a wireless link is foreseen, between the vehicle 100 and a communications terminal 102 installed in proximity to the car park or garage parking space 118. In order to avoid possible violations of privacy and reduce the additional components, the use of a wireless optical connection is proposed, using the vehicle lights 104 to transmit the data from the ECU of the vehicle by means of a link by means of Visible Light Communication (VLC) to an optical receiver 106, by means of sending a data message (122). For the VLC, at least one light with LED technology must be used, preferably employing the headlights but with the ability to employ any other (side lights, tail lights, fog lights, etc.) lights with LEDs. One single light can be employed, it is not necessary to use the two lights as shown in FIG. 1.

Similarly, for starting the optical communication, two different methods are proposed: an automatic transmission by the vehicle or a communication controlled from the communications terminal. The latter case is based on a wireless transmission (for example, infrared, WiFi, Bluetooth, etc.) from a wireless emitter 108 of the communications terminal 102 of the car park (for example, in the form of a beacon) to a wireless receiver 110 installed in the vehicle 100. In this way, when the user parks the vehicle, the communications terminal can detect, by means of, for instance, a presence sensor or detector (not shown in the figure) that the vehicle has been parked, and in this case, will request to vehicle by means of the wireless emitter 108 (in the example of FIG. 1, by means of infrared communication) the sending of required data from the ECU of the vehicle, related to warnings, breakdowns, incidents, state of components, etc., which will be employed for the preventative diagnostic. For this, it sends an information request signal 120 (for example, a determined message).

As previously mentioned, there is also the possibility that the transmission begins automatically by the vehicle when it detects a determined situation, such as the data transmission system is activated and the vehicle has been parked for a determined amount of time (which can be interpreted as being in its garage), or by means of a remote control that activates the immediate transmission of the information. In this case, the system of the vehicle is simplified and cheapened, as well as the beacon which should be connected to await the reception of the appropriately coded and formatted information of the vehicle. This is a simple and economic solution that does not greatly reduce the performance of the system, therefore it can be an attractive option for the majority of situations.

In the case of the system having bidirectional communication, there are a number of ways of implementing the beginning of the optical communication between the vehicle 100 and the communications terminal 102. However, in a preferred embodiment, said communications is implemented automatically and transparent for the user, by means of automatic detection of the vehicle when it is parked and the request, also automatic of the data from the ECU, in a way that the user does not have to perform any action, another number of ways of beginning the optical communication are also foreseen. In this way, the beginning of the VLC communication may be forced by the user himself; for instance, by means of pressing a button specially enabled for such purpose in the dashboard or the control panel of the vehicle. Or said communication could be programmed in a periodic way, every certain number of hours.

Finally, the communications terminal 102, both in the case of bidirectional (the communications terminal 102 has a wireless emitter 108) as well as in the unidirectional (the communications terminal 102 does not have a wireless emitter 108 and thus, only the vehicle transmits 100, which does not have a wireless receiver 110), uses a communications network 112 (either wired or wireless; for example, a connection to the Internet or any other type of telecommunication network, such as the telephone network by means of using a GPRS or UMTS connection—sending SMS, MMS, WAP messages, etc.—) in order to connect to an analysis terminal 114 and send it the captured information of the vehicle. Said analysis terminal 114 is normally installed in a repair shop 116 or in a factory of the brand of the vehicle, and is responsible for analysing the data to make decisions and perform the corresponding actions. Said actions may include the sending of a notice to the user, for example, informing the user of an action to be performed on the vehicle or suggesting the user to urgently take the car to a repair shop for servicing. The information sent in the message from the communications terminal 102 to the analysis terminal 114 includes the identification of the vehicle and/or user, apart from the relevant information acquired from the ECU of the vehicle. In the same way, it is possible that the information collected by the terminal is also available to the user of the vehicle, or at least a subset to them, which may be of personal interest such as average consumption, mileage, fuel level, etc.

Figure 2:
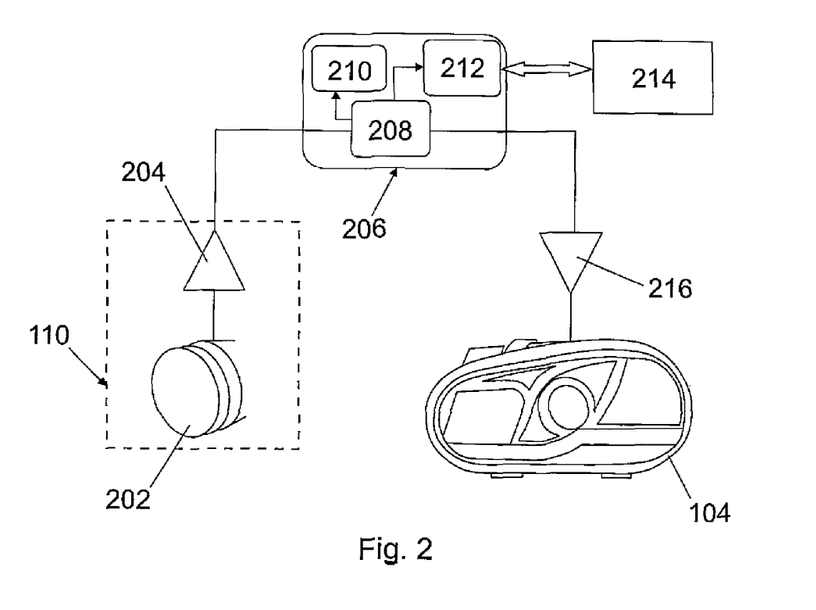
FIG. 2 shows, in a possible embodiment, a diagram with the elements of the system.

FIG. 2 shows in a schematic way, a possible embodiment of the elements of the system included in the motor vehicle 100. Firstly, it has a wireless receiver 110, in the example of the figure, an IR detector 202 with an optical receiver 204, which receives the request of data from the communications terminal 102. A control unit 206, formed in an embodiment by a microcontroller 208, a memory 210 (internal or external to the microcontroller 208) and a communications module 212 (internal or external to the microcontroller 208), receives the information captured by the wireless receiver 110. The communications module 212 is in communication with the ECU of the vehicle 214 (for example, by means of CAN) and obtains the necessary data. In turn, the control unit 206 transmits data coming from the ECU (214) through the activation of the lights, by means of VLC, and by means of the control of an optical transmitter 216 that switches the current circulating through the LED light, with purpose of turning it on and off, thus carrying out the transmission of the pulses of light with the coded information. Said transmitter mainly consists of a power stage generally transistorised, which allows for controlling the current to pass from the battery of the vehicle to the transmission LED or LEDs.

Figure 3:
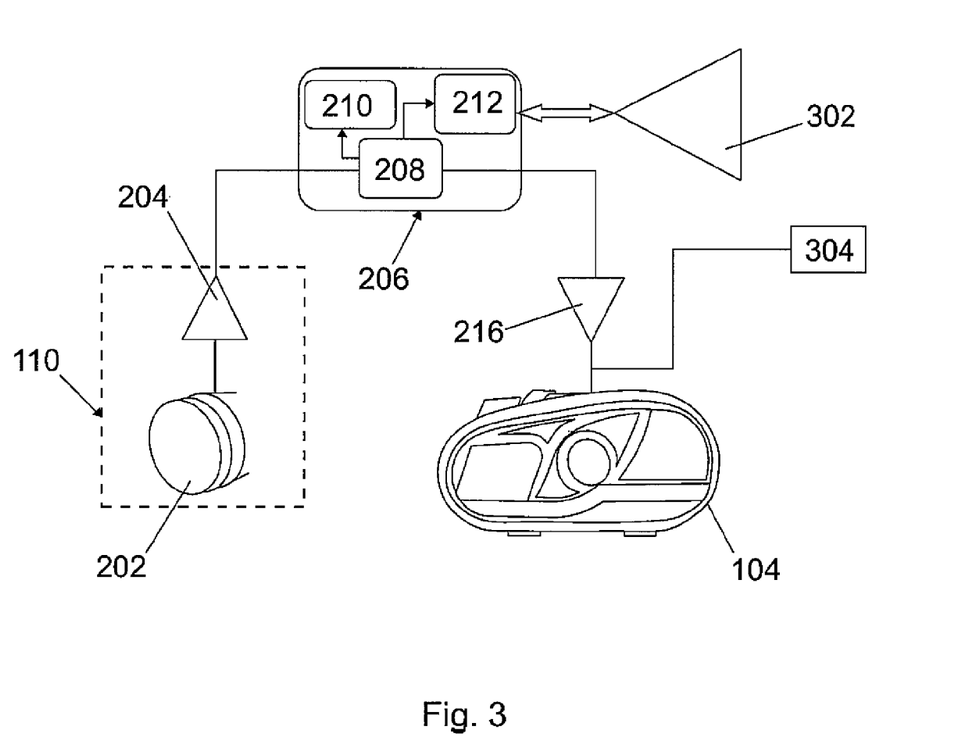
FIG. 3 shows a diagram with the elements of the system, in the event that the vehicle has to be modified once it has left the factory.

FIG. 2 may refer to a vehicle leaving the factory. For a vehicle that has already left the factory, some simple modifications must be performed, as shown in FIG. 3:

The connection with the ECU is done using a connector 302 compatible with the output that the standard ECU has.

The power supply wiring of the lights should be modified in a way that the current that reaches the lights can do so from the usual controls of the vehicle, conventional actuation 304, or from the control unit 206, enabling a parallel connection as indicated in the figure.

The wireless receiver circuit 110, in the case of the bidirectional system, as it is new does not require any electrical adaptation but rather mechanical, so that it is well attached, as well as the control unit 206, for which a space must be found for its location and for its power supply from the battery of the vehicle.

The communication between the control unit 206 and the ECU of the vehicle 214 is adapted to the protocol that the ECU uses in its usual operation. In this way, a transparent operation is achieved to the ECU that does not require a new specific programming for the connection to the diagnostic system of the present invention.

In order to implement a VLC communication for the vehicle, it is necessary that the lights use LED technology as they are the only ones that can allow a switching speed (on and off) sufficiently fast and efficient to carry out the communication. The transmission is carried out controlling the current that circulates through the lights, breaking it completely to switch them off and connecting it to switch the lights on. With this transmission methodology, it is possible to use different communication techniques of the data such as On-Off Keying (OOK), Pulse Position Modulation (PPM) or Pulse Width Modulation (PWM), among others. It is also possible to use another type of modulations that include different levels of illumination (not only on and off), what allow to increase the bit rate but complicate the optical receipt block.

Figure 4A:
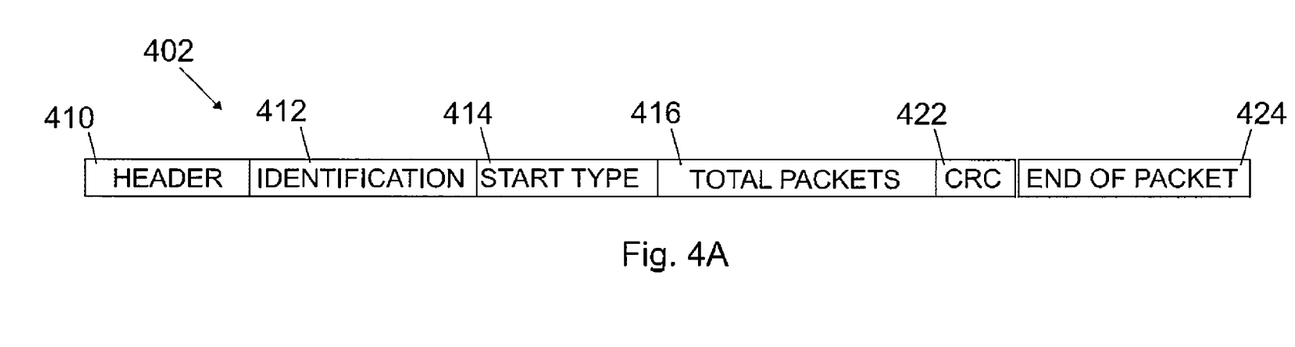
FIGS. 4A and 4B show a possible diagram of the optical message transmitted by the lights of the vehicle.
Figure 4B:
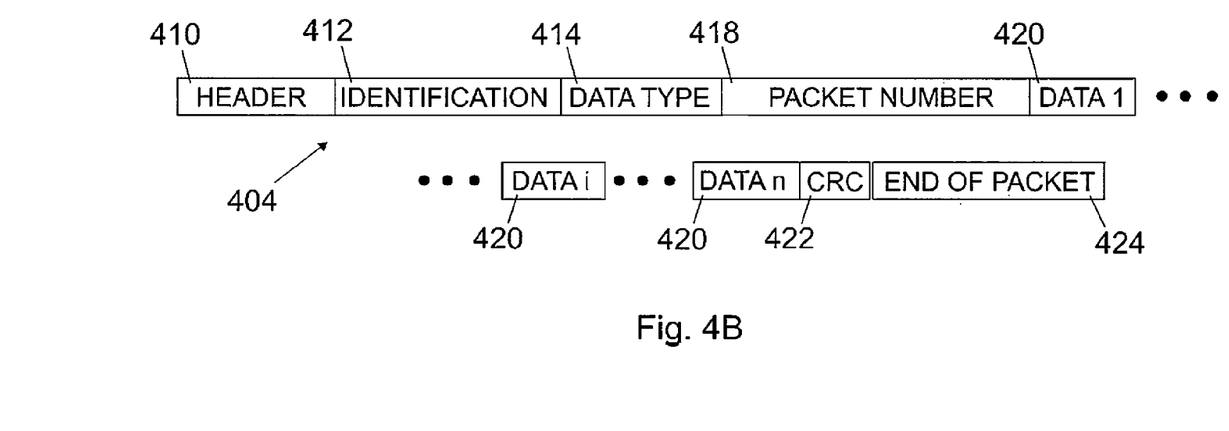

The message to be transmitted by the vehicle consists mainly of the various packets of data that include the following blocks, as shown in FIGS. 4A y 4B:

Header 410: so that the receiver can synchronize and detect that what is being received is a valid message.

Identification: allows to univocally identify the vehicle (number plate, vehicle identification number, repair shop user code, etc).

Type of packet 414: that differentiates between the two types of basic packets:
  Start packet 402 (FIG. 4A): with the total number of packets 416 to be transmitted.
  Data packet 404 (FIG. 4B): with the information itself. In this case, in the field of the type of packet 414 the transmitted packet number 418 is included.

Data field 420: composed of different frames of different sizes where the information collected from the ECU can be found. According to the nature of the information, the different frames can have a size of 1 bit for alarms or warnings (motor failure, low battery, etc.) or one or more bytes for alphanumeric data (temperature, fuel level, miles, etc). Each packet will include a different number or data depending on its size until the message completes the correct transmission of all the data.

CRC 422: to verify the correct transmission of the data

End of packet code 424.

Figure 5:
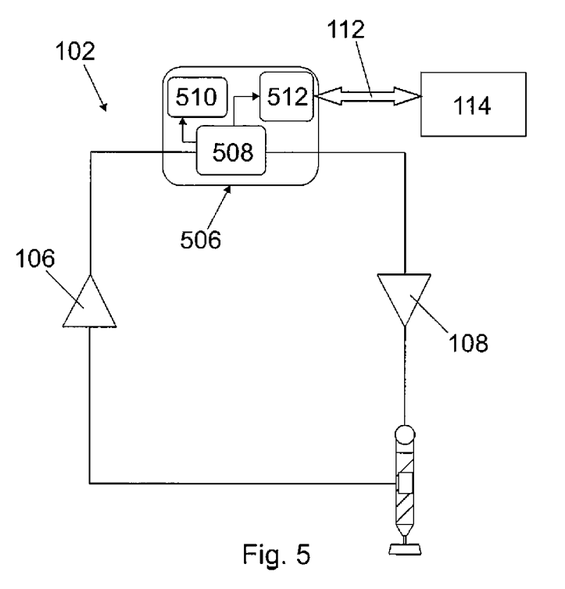
FIG. 5 shows a diagram of the components of the communications terminal.

FIG. 5 shows a simplified diagram of the electronic components of the communications terminal 102, that comprises an optical receiver 106 to receive the optical VLC signals and a control unit 506 (formed in a preferred embodiment by a microcontroller 508, a memory 510 and a communications module 512) that decodes the optical messages received and reformats them for the transmission via communications network 112 to the destination, an analysis terminal 114 where the analysis of the data is carried out. Furthermore, in the bidirectional case, a wireless emitter 108 is required which sends orders to the vehicle for data transmission.

Figure 6:
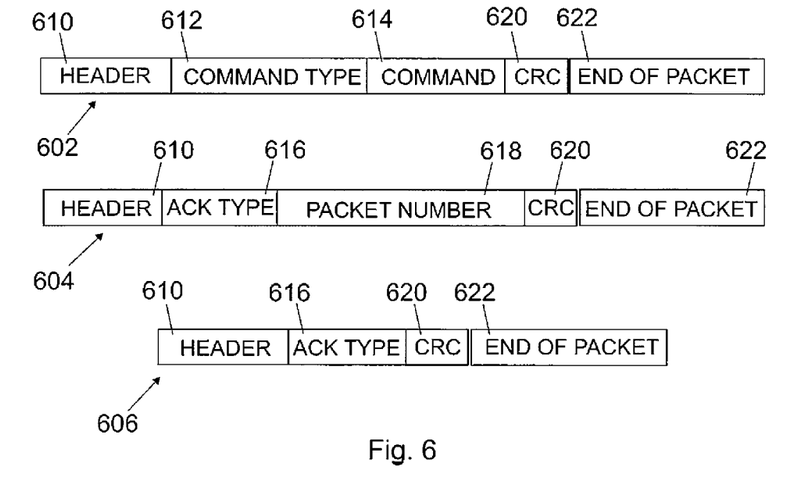
FIG. 6 shows the diagram of the different possible packets transmitted in a bidirectional communication between the communications terminal and the vehicle together with those shown in FIGS. 4A and 4B.

In the case of unidirectional communication, the communications terminal 102 does not transmit any data to the vehicle 100 but rather awaits the optical transmission of the data from the vehicle 100 to decode it. However, in the bidirectional case, it is necessary to transmit information to the vehicle 100. FIG. 6 shows the diagram of possible packets transmitted. Basically, there are two types of packets or frames:

Command packets 602, which can be classified in two types, depending on the type of command 612 specifying:
  Transmission request: to indicate to the vehicle to begin sending the information.
  Performance of action: includes instructions to be transmitted to the ECU so that it performs some type of action that it has programmed (changes in the injection of fuel, activation of the alarm, etc.).
  The command packets can include in the command field 614 information relative to the command, for example the specific action to be performed.

Packets of confirmation of receipt, either confirmation of receipt from the vehicle 604 or from the terminal 606. It is included in the appropriate field which is a packet of this type (ACK field type 616, for "Acknowledgement"). The packet number 618 received can also be included, for example to confirm that the command packets are received correctly.

Below is an explanation of a possible embodiment of the diagnostic method according to the present invention.

Once the vehicle is parked, the control unit 206 of the vehicle starts the process of elaboration of the message with the updated data, to have it available for its transmission. For this, a connection with the ECU of the vehicle is established and the appropriate information is extracted. The communication protocol of this connection and the number and type of data to be extracted will depend on the ECU so it is programmed for the specific model of the ECU in each case.

Subsequently, the data transmission process begins, which can be activated in different ways: by means of a button in the dashboard, when a number or pre-programmed conditions have been met in the control unit 206 (such as a determined amount of time has passed from when the vehicle was parked) or, in the case of a bidirectional system, which receives a command from the communications terminal 102 to carry out the transmission.

Figure 7:
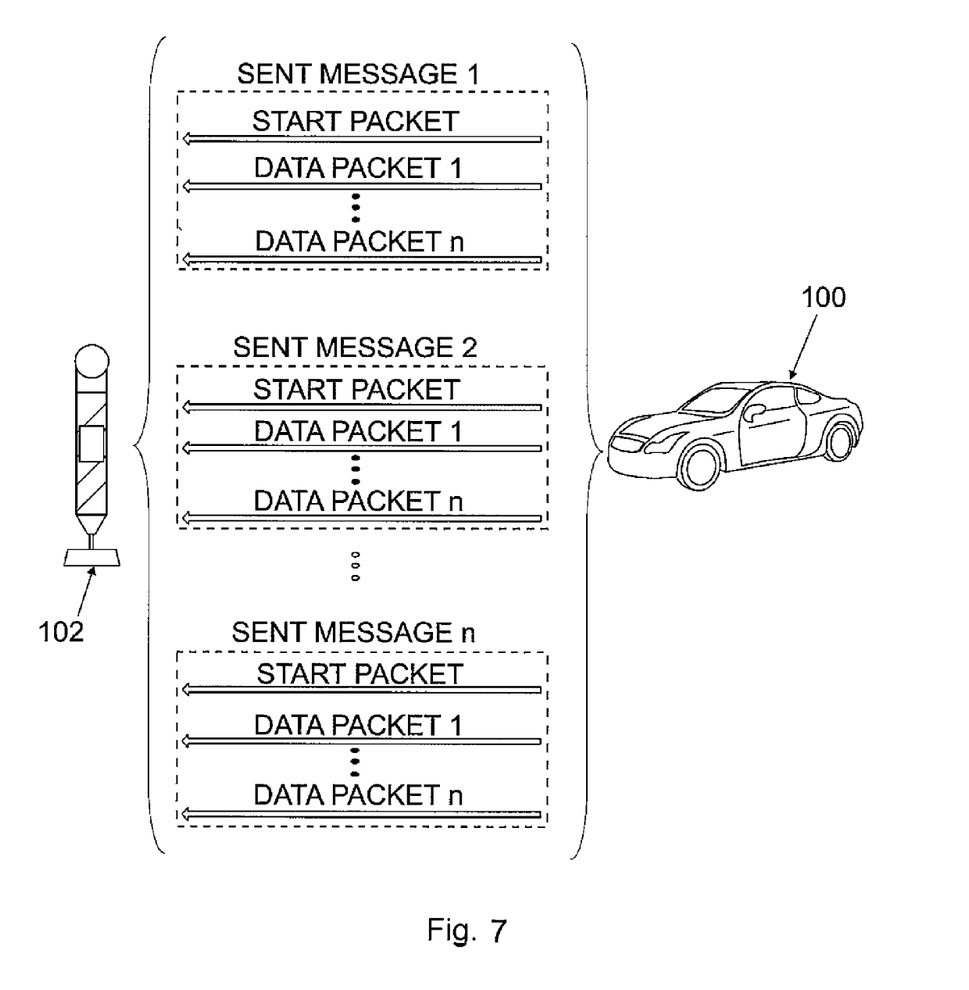
FIG. 7 shows an example of unidirectional communication between the communications terminal and the vehicle.

The transmission of the data depends on whether the communication system is unidirectional or bidirectional. In the former case, represented in FIG. 7, the data message is repeated a determined number of times (according to what is programmed in the control unit of the invention) that is sufficient to assure a transmission as correct as possible. In turn, the communications terminal 102 is programmed to activate the receiving in a period of time where it can be assured that the vehicle available for transmission will be there. As soon as it receives a correct message, it formats it and stores it for subsequent transmission or when it has programmed it.

Figure 8:
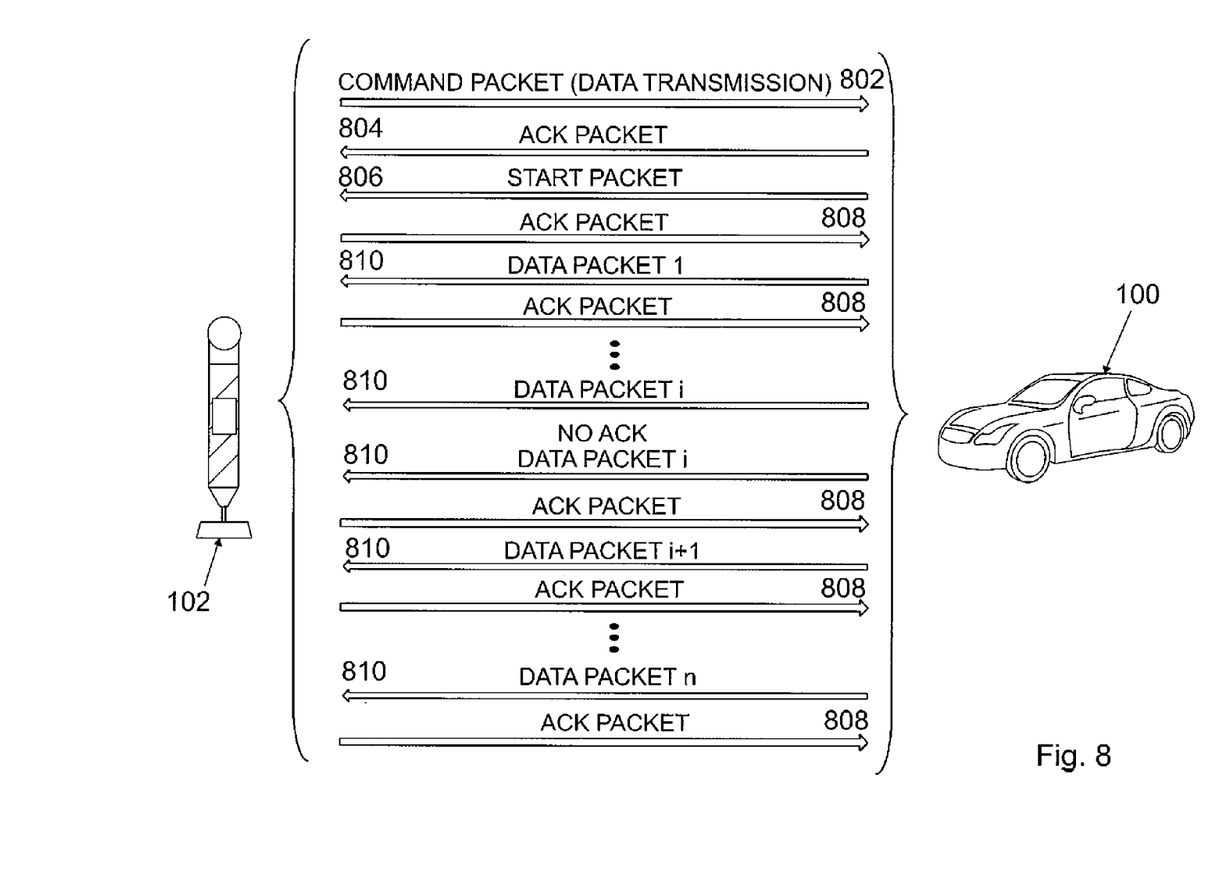
FIG. 8 shows an example of bidirectional communication between the communication terminals and the vehicle.

In the case of a bidirectional communication system, shown in FIG. 8, the transmission process is controlled by the control frames and the acknowledgement of the packets of the communications terminal 102 and the data packet frames and command acknowledgement of the vehicle. Firstly, the communications terminal 102, according to a temporary programming or the detection that the vehicle has parked, sends a transmission command 802 (if the system also allows, other commands can be sent before or after the transmission of the message). To this frame, the vehicle 100 responds with an acknowledgement packet of receipt 804 and starts the transmission with a start packet 806 where the number of packets to be transmitted is indicated and, subsequently, each one of the packets. For each packet 810 transmitted by the vehicle 100, including all the data packets 810, this should receive an acknowledgement packet 808 from the communications terminal 102. In the event that it is not received and a guard time has elapsed, it will transmit the packet again. If acknowledgement of the ECU is received, the following packet is sent and if not, the retransmission is attempted a number of times after which the transmission is considered to have a fault and it would be necessary to begin the communication from the start, the system of the vehicle awaiting the arrival of a data transmission command. In the case that the communications terminal does not receive the acknowledgement packet from the vehicle, it will repeat the action once a guard time has passed and for a number of times established in the programming. In the event that a connection cannot be made with the vehicle, an error in the communication of the transmission will be sent to the diagnostic centre.

Figure 9:
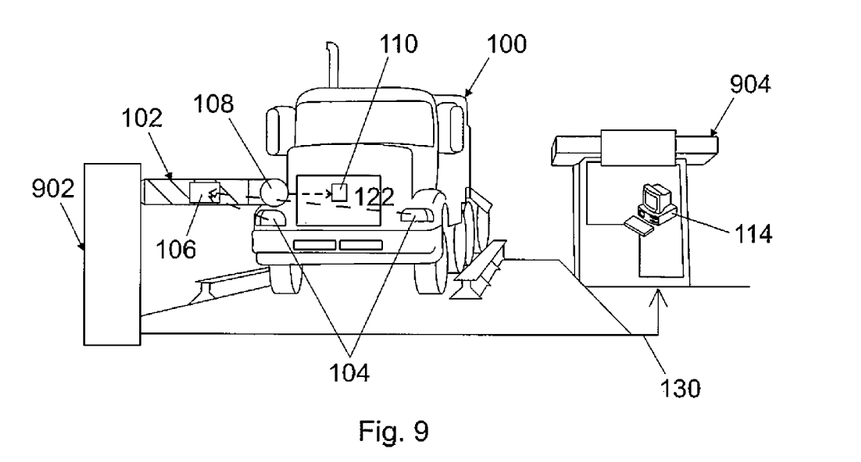
FIG. 9 shows another possible application of the system, in this case for controlling access or the diagnostic and supervision of control data (tachometer, etc.) in heavy vehicles.

Finally, FIG. 9 shows another possible application of the present invention, in this case applied to obtaining information contained in a vehicle 100 for the control of access. In a possible embodiment of the invention, the vehicle may be a lorry accessing a factory to be loaded with goods, in a way that upon approaching the communication terminal 102, installed for example in the access barrier 902 that controls the entry to the factory, a presence sensor (not shown in the figure) detects the lorry and the control unit 508 of the communications terminal 102 then sends, via the wireless emitter 108, a request for specific information to the vehicle.

The information required may be any of the information that the vehicle has available; either contained in its ECU or in any other element installed in the vehicle, for example a tachograph. Therefore, for example, for the control of access, the number plate could be required (for which the recognition of the number plate would be automated without the need for cameras), or even the vehicle identification number stored in the ECU, or any other relevant information. Once said information has been obtained, emitted by the vehicle using the lights, the communications terminal sends 130 (either via wiring or wireless) said information to an analysis terminal 114 or control centre, installed, for example, in the access control cabin 904, which analyses and registers the information, permitting or not permitting the entry of the vehicle by means of control of the access barrier 902.

There are many other possible applications. For example, data not only from the ECU but also from a tachograph or other control or measurement elements installed in the vehicle can be obtained, in a way that it can be checked at a control point that everything is correct (e.g. hours of circulation, breaks, maximum speed, etc.) and thus allow or prohibit entry, or stop the vehicle, which increases road safety and prevent possible accidents. Similarly, obtaining said data would be facilitated, as everything would be performed quickly, effectively and transparent to the user. It could even be performed without stopping the vehicle.

Figure 10A:
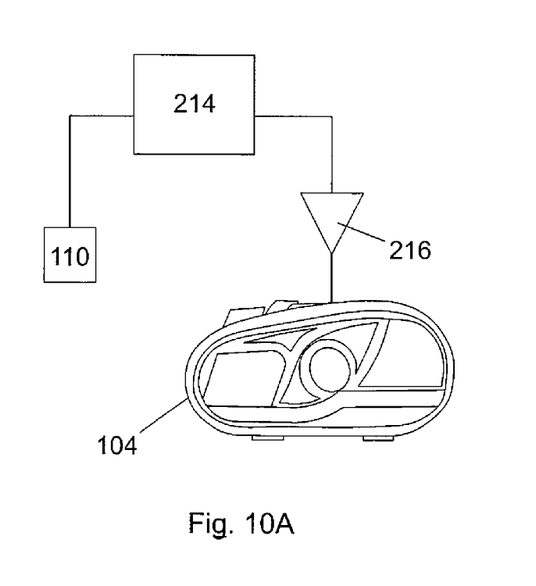
FIGS. 10A and 10B show embodiments of the bidirectional and unidirectional system, respectively, for the case wherein the control unit forms part of the ECU of the vehicle.
Figure 10B:
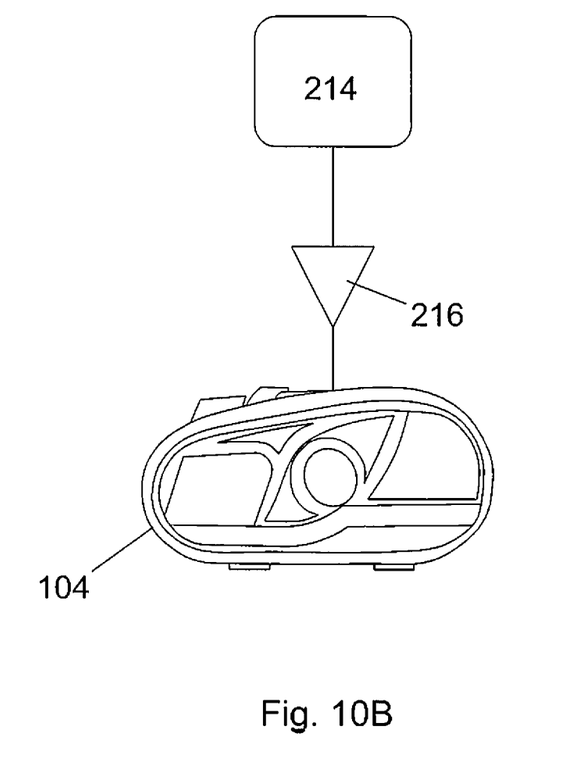

In another possible embodiment, shown in FIGS. 10A and 10B, useful for factory vehicles, the control unit 206 may form part of the ECU 214, i.e., the ECU itself of the vehicle may be employed as a control unit. The embodiment of FIG. 10A corresponds to the bidirectional communication, while FIG. 10B corresponds to the unidirectional communication. In this way, the wireless receiver 110 (for the bidirectional communications; in the case that the unidirectional communications are not present, as shown in FIG. 10B) is connected with the control unit (i.e. the ECU 214), and this is programmed for activating the lights and sending the required information using the lights when it receives the information request signal.

The invention claimed is:

1. System for the access to information contained in motor vehicles, comprising:
a control unit (206) configured for:
capturing determined vehicle information (100) coming from at least one electronic component thereof once an information request signal (120) has been received;
generating a data message from said information;
an optical transmitter (216) controlled by the control unit (206) and configured for the transmission of said data message (122) by means of visible optical communication using at least one light (104) of the vehicle; and
a communications terminal (102) external to the vehicle (100) and with an optical receiver (106) for the capturing of the data message transmitted by at least one light (104) of the vehicle, wherein the communications terminal (102) comprises a wireless emitter (108) for sending the information request signal (120) and a presence sensor, the wireless emitter (108) being configured to carry out the sending of the information request signal (120) when said presence sensor detects the presence of the vehicle (100).

2. System according to claim 1, wherein the vehicle information to be captured and transmitted is specified in the information request signal (120).

3. System according to claim 1, that comprises claim 1 comprising a wireless receiver (110) installed in the vehicle (100) responsible for receiving the information request signal (120).

4. System according to claim 1, wherein the communications terminal (102) comprises a control unit (506) with one communications module (512) for the transmission of a message (130) based on the information captured by the optical receiver (106) to an analysis terminal (114).

5. System according to claim 4, wherein the system further comprises an analysis terminal (114) with means of data processing configured for analysing the message received and performing at least one action depending on said analysis.

6. System according to claim 5, wherein the analysis carried out by the analysis terminal (114) is directed to a control of access of the vehicle at a determined facility, and wherein the at least one action to be performed is directed to permitting or not permitting the access of the vehicle into the facility depending on the analysis carried out.

7. System according to claim 5, wherein the analysis carried out by the analysis terminal (114) is directed at a diagnostic for detecting possible breakdowns or malfunctioning in the vehicle, and wherein the at least one action to be performed is directed at communicating said faulty situation should it occur.

8. Method for the access to information contained in motor vehicles, comprising:
capturing determined information of the vehicle (100) coming from at least one electronic component thereof once an information request signal (120) is received;
generating a data message from said information;
transmitting said data message (122) by means of visible optical communication through at least one light (104) of the vehicle
wherein the information request signal (120) is sent by a wireless emitter (108) external to the vehicle and is received by a wireless receiver (110) installed in the vehicle (100), and
wherein the method further comprises detecting the presence of the vehicle by means of a presence sensor, and wherein the information request signal (120) is subsequently sent to the detection of the vehicle.

9. Method according to claim 8, wherein the data message (122) is transmitted through at least one of the headlights of the vehicle.

10. Method according to claim 8, wherein the vehicle information to be captured and transmitted is specified in the information request signal (120).

11. Method according to claim 8 comprising capturing, by means of an optical receiver (106) external to the vehicle (100), the data message transmitted by at least one light (104) of the vehicle.

12. Method according to claim 11 comprising transmitting a message (130) based on the information captured by the optical receiver (106) to an analysis terminal (114).

13. Method according to claim 12 comprising analysing the message received in the analysis terminal (114) and performing at least one action depending on said analysis.

14. Method according to claim 13, wherein the analysis of the message received in the analysis terminal (114) is directed to a control for vehicle access to a determined facility, and wherein the at least one action to be performed is directed to permitting or not permitting the access of the vehicle to the facility depending on the analysis performed.

15. Method according to claim 13, wherein the analysis of the message received in the analysis terminal (114) is directed at a diagnostic for detecting possible breakdowns or malfunctioning in the vehicle, and wherein the at least one action to be performed is directed to communicating said faulty situation should it occur.

* * * * *